United States Patent [19]

Lee et al.

[11] 3,723,504
[45] Mar. 27, 1973

[54] PHARMACEUTICALLY ACTIVE DERIVATIVES OF ETHANOOCTA-HYDROPHENANTHRENE

[75] Inventors: Kyu Tai Lee; Joel G. Whitney, both of Wilmington, Del.

[73] Assignee: E. I. du Pont de Nemours and Company, Wilmington, Del.

[22] Filed: Feb. 11, 1971

[21] Appl. No.: 114,682

Related U.S. Application Data

[62] Division of Ser. No. 709,908, March 4, 1968, Pat. No. 3,565,944.

[52] U.S. Cl............260/479 R, 260/410, 260/410.5, 260/488 CD, 260/485 L, 260/612 R, 260/613 R, 260/618 F, 424/311, 424/312, 424/313, 424/340, 424/341, 424/343, 424/346

[51] Int. Cl........................C07c 55/10, C07c 69/14

[58] Field of Search..........260/479 R, 618 E, 619 F, 260/613 R, 612 R, 485 L, 611 A, 410, 410.5, 260/618 F, 488 CD

[56] References Cited

UNITED STATES PATENTS 3,446,846    5/1969    Whitney..............................260/578

*Primary Examiner*—James A. Patten
*Attorney*—Paul R. Steyermark

[57] ABSTRACT

Certain novel disubstituted and polysubstituted derivatives of 2,4'-ethanooctahydrophenanthrene-2-methanol and 2,4'-ethanohexahydrophenanthrene-2-methanol are useful as antifertility agents when administered to animals.

5 Claims, No Drawings

PHARMACEUTICALLY ACTIVE DERIVATIVES OF ETHANOOCTA-HYDROPHENANTHRENE

CROSS REFERENCE TO RELATED APPLICATION

This application is a divisional of our copending application Ser. No. 709,908, filed Mar. 4, 1968 and now U.S. Pat. No. 3,565,944.

BACKGROUND OF THE INVENTION

The parent application, Ser. No. 709,908 discloses certain novel di- and polysubstituted derivatives of 2,4'-ethanooctahydrophenanthrene and 2,4'-ethanohexahydrophenanthrene, which are useful as postcoital antifertility agents, and claims compounds having the following Formula 1:

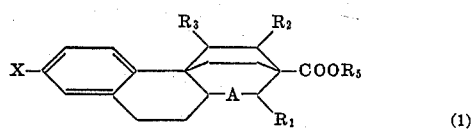

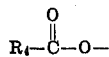    (1)

where A is a single bond or a double bond; each of $R_1$, $R_2$, and $R_3$ independently is hydrogen or a $C_1$—$C_6$ alkyl;

X is hydrogen, hydroxyl, the —OR group, or the $$R_4-\overset{O}{\underset{\|}{C}}-O-$$

group, where R is a $C_1$—$C_4$ alkyl and $R_4$ is hydrogen or a $C_1$—$C_{12}$ alkyl; with the limitation that when X is hydrogen, at least one of $R_1$, $R_2$, and $R_3$ is a $C_1$—$C_6$ alkyl; and $R_5$ is hydrogen, a $C_1$—$C_6$ alkyl, or a nontoxic, pharmaceutically acceptable salt-forming cation.

SUMMARY OF THE INVENTION

Certain other derivatives of 2,4'-ethanooctahydrophenanthrene and 2,4'-ethanohexahydrophenanthrene, represented by the following Formula (2), also are effective postcoital antifertility agents:

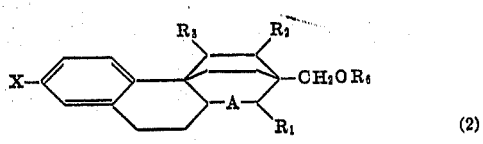

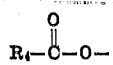   (2)

where
A is a single bond or a double bond;
each of $R_1$, $R_2$, and $R_3$ independently is hydrogen or a $C_1$—$C_6$ alkyl;
X is hydrogen, hydroxyl, the —OR group, or the $$R_4-\overset{O}{\underset{\|}{C}}-O-$$

group, where R is a $C_1$—$C_4$ alkyl and $R_4$ is hydrogen or a $C_1$—$C_{12}$ alkyl; with the proviso that when X is hydrogen, at least one of $R_1$, $R_2$, and $R_3$ is a $C_1$—$C_6$ alkyl; and $R_6$ is hydrogen, an ester-forming, $C_1$-$C_4$ aliphatic monocarboxylic acid radical, or a hemiester-forming $C_3$-$C_6$ aliphatic dicarboxylic acid radical.

DETAILED DESCRIPTION OF THE INVENTION

Preferred compounds of this invention are those in which X is HO—, $CH_3O$—, $C_2H_5O$—, or $CH_3COO$—; $R_6$ is hydrogen and $R_1$, $R_2$, and $R_3$ are all hydrogens, or at least one of $R_1$, $R_2$, and $R_3$ is methyl or ethyl. When $R_6$ is an acid radical, it can be, for example, one of the following groups: acetyl, propionyl, hemisuccinyl, or hemiglutaryl.

A convenient starting material for preparing the compounds of this invention is a substituted α-tetralone. The desired α-tetralone is treated with ethyl ethoxymethylene-cyanoacetate in glyme in the presence of sodium ethoxide under a nitrogen atmosphere. The intermediate thus formed is treated with dilute aqueous hydrochloric acid to give an alpha pyrone such as 8-methoxy-5,6-dihydro-2-oxo-2H-naphtho[1,2-b]pyran-3-carboxylic acid ethyl ester.

The α-pyrone is heated at 150°–200° C. with ethylene under pressure (2,000–3,000 atm.) in the presence of a solvent such as benzene or without solvent to give the corresponding 2,3,4,4',9,10-hexahydro-2,4'-ethanophenanthrene-2-carboxylic acid ethyl ester. This ester is then hydrolyzed to give the corresponding 2,3,4,4',9,10-hexahydro-2,4'-ethanophenanthrene-2-carboxylic acid.

In order to prepare the 3,4-alkyl substituted ethanophenanthrene, the above α-pyrone is heated at 150°–200° C. with an appropriate monoalkyl or dialkylethylene under pressure (1,000–1,500 atm.) in the presence of a solvent such as benzene or without solvent to give 3,4,9,10-tetrahydro-3,4-dialkylphenanthrene-2-carboxylic acid ethyl ester. This diene is heated at 150°–200° C. with ethylene under pressure (2,000–3,000 atm.) to give 2,3,4,4',9,10-hexahydro-3,4-dialkyl-2,4'-ethanophenanthrene-2-carboxylic acid ethyl ester. The order in which the dialkyl substituted ethylene and the ethylene are added to the pyrone can be reversed. When the dialkyl groups of ethylene are not identical or the geometry of the dialkyl substituted ethylene is either cis or trans, the resulting 3,4-dialkyl derivative may consist of several isomers. They can be separated by conventional techniques such as fractional crystallization, distillation or chromatography.

In order to prepare the 2-alkyl substituted derivative, an appropriate 2,3,4,4',9,10-hexahydro-2,4'-ethanophenanthrene-2-carboxylic acid ethyl ester is treated with borane ($BH_3$) in tetrahydrofuran (THF) or in ethylene glycol dimethyl ether (glyme). The resulting boron derivative is oxidized with chromic acid to give a keto-ester such as 1,2,3,4,4',9,10,10'-octahydro-2,4'-ethano-1-oxophenanthrene-2-carboxylic acid ethyl ester. This keto-ester is contacted with appropriate alkyl Grignard reagent in THF to give the 1-alkyl substituted hydroxy-ester, which on treatment with p-toluenesulfonyl chloride in pyridine gives 2,3,4,4',9,10-hexahydro-1-alkyl-2,4'-ethanophenanthrene-2-carboxylic acid ethyl ester. The appropriate keto-acid can be employed in this reaction in place of the keto-ester with equally satisfactory results.

When the corresponding 1,2,3,4,4',9,10,10'-octahydro derivatives are desired, 2,3,4,4',9,10-hexahydro-2,4'-ethanophenanthrene-2-carboxylic acid ethyl ester can be reduced in the presence of a hydrogenation catalyst such as platinum oxide and a solvent to give corresponding 1,2,3,4,4',9,10,10'-octahydro-2,4'-ethanophenanthrene-2-carboxylic acid ethyl ester. Solvents which can be used for this reaction include ethanol, ethyl acetate and glacial acetic acid.

A more convenient method of preparing the 1-alkyl-1,2,3,4,4',9,10,10'-octahydro derivative is to treat the above mentioned 1,2,3,4,4',9,10,10'-octahydro-2,4'-ethano-1-oxophenanthrene-2-carboxylic acid ethyl ester with an appropriate alkyl Wittig reagent such as alkylene triphenylphosphine or alkylene phosphonate in THF to give 1,2,3,4,4',9,10,10'-octahydro-2,4-'-ethano-1-alkylenephenanthrene-2-carboxylic acid ethyl ester. This alkylene derivative is then reduced in the presence of a hydrogenation catalyst in a suitable solvent such as ethanol, ethyl acetate or glacial acetic acid to give corresponding 1,2,3,4,4',9,10,10'-octahydro-2,4'-ethano-1-alkylphenanthrene-2-carboxylic acid ethyl ester.

The compounds of Formula (2) in which $R_6$ is hydrogen, hereinafter called the alcohols of this invention, are conveniently prepared by refluxing a mixture of the appropriate 1,2,3,4,4',9,10,10'-octahydro- or 2,3,4,4',9,10-hexahydro-2,4'-ethanophenanthrene-2-carboxylic acid ethyl ester, a reducing agent preferably lithium aluminum hydride, and a solvent such as THF or glyme under a nitrogen atmosphere until reaction is complete. The product is isolated by using conventional techniques.

The compounds of Formula (2) in which $R_6$ is an ester-forming acid radical are hereinafter called the esters of this invention. These esters can be conveniently made by methods well known to the art, for instance, by contacting alcohols of the present invention with suitable acid halides in the presence or absence of proton acceptors or with suitable acid anhydrides. The resulting esters of the present invention can then be isolated and purified by conventional techniques.

Illustrative of the alcohols of this invention are the following:
7-methoxy-2,3,4,4',9,10-hexahydro-2,4'-ethanophenanthrene-2-methanol
7-methoxy-1,2,3,4,4',9,10,10'-octahydro-2,4'-ethanophenanthrene-2-methanol
7-hydroxy-2,3,4,4',9,10,10'-hexahydro-2,4'-ethanophenanthrene-2-methanol
7-hydroxy-1,2,3,4,4',9,10,10'-octahydro-2,4'-ethanophenanthrene-2-methanol
7-acetoxy-2,3,4,4',9,10-hexahydro-2,4'-ethanophenanthrene-2-methanol
7-acetoxy-1,2,3,4,4',9,10,10'-octahydro-2,4'-ethanophenanthrene-2-methanol
7-methoxy-1-methyl-2,3,4,4',9,10-hexahydro-2,4'-ethanophenanthrene-2-methanol
7-methoxy-1-methyl-1,2,3,4,4',9,10,10'-octahydro-2,4'-ethanophenanthrene-2-methanol
7-hydroxy-1-methyl-2,3,4,4',9,10-hexahydro-2,4'-ethanophenanthrene-2-methanol
7-hydroxy-1-methyl-1,2,3,4,4',9,10,10'-octahydro-2,4'-ethanophenanthrene-2-methanol
7-acetoxy-1-methyl-2,3,4,4',9,10-hexahydro-2,4'-ethanophenanthrene-2-methanol
7-acetoxy-1-methyl-1,2,3,4,4',9,10,10'-octahydro-2,4'-ethanophenanthrene-2-methanol
1-ethyl-7-methoxy-2,3,4,4',9,10-hexahydro-2,4'-ethanophenanthrene-2-methanol
1-ethyl-7-methoxy-1,2,3,4,4',9,10,10'-octahydro-2,4'-ethanophenanthrene-2-methanol
1-ethyl-7-hydroxy-2,3,4,4',9,10,10'-hexahydro-2,4'-ethanophenanthrene-2-methanol
1-ethyl-7-hydroxy-1,2,3,4,4',9,10,10'-octahydro-2,4'-ethanophenanthrene-2-methanol
7-acetoxy-1-ethyl-2,3,4,4',9,10-hexahydro-2,4'-ethanophenanthrene-2-methanol
7-acetoxy-1-ethyl-1,2,3,4,4',9,10,10'-octahydro-2,4'-ethanophenanthrene-2-methanol
3,4-dimethyl-7-methoxy-2,3,4,4',9,10-hexahydro-2,4'-ethanophenanthrene-2-methanol
3,4-dimethyl-7-methoxy-1,2,3,4,4',9,10,10'-octahydro-2,4'-ethanophenanthrene-2-methanol
3,4-dimethyl-7-hydroxy-2,3,4,4',9,10-hexahydro-2,4'-ethanophenanthrene-2-methanol
3,4-dimethyl-7-hydroxy-1,2,3,4,4',9,10,10'-octahydro-2,4'-ethanophenanthrene-2-methanol
7-acetoxy-3,4-dimethyl-2,3,4,4',9,10-hexahydro-2,4'-ethanophenanthrene-2-methanol
7-acetoxy-3,4-dimethyl-1,2,3,4,4',9,10,10'-octahydro-2,4'-ethanophenanthrene-2-methanol
7-methoxy-1,3,4-trimethyl-2,3,4,4',9,10-hexahydro-2,4'-ethanophenanthrene-2-methanol
7-methoxy-1,3,4-trimethyl-1,2,3,4,4',9,10,10'-octahydro-2,4'-ethanophenanthrene-2-methanol
7-hydroxy-1,3,4-trimethyl-2,3,4,4',9,10-hexahydro-2,4'-ethanophenanthrene-2-methanol
7-hydroxy-1,3,4-trimethyl-1,2,3,4,4',9,10,10'-octahydro-2,4'-ethanophenanthrene-2-methanol
7-acetoxy-1,3,4-trimethyl-2,3,4,4',9,10-hexahydro-2,4'-ethanophenanthrene-2-methanol
7-acetoxy-1,3,4-trimethyl-1,2,3,4,4',9,10,10'-octahydro-2,4'-ethanophenanthrene-2-methanol
7-methoxy-1,3,4-triethyl-2,3,4,4',9,10-hexahydro-2,4'-ethanophenanthrene-2-methanol
7-methoxy-1,3,4-triethyl-1,2,3,4,4',9,10,10'-octahydro-2,4'-ethanophenanthrene-2-methanol.

The esters of this invention result from the esterification of the 2-methanol group in the above alcohols.

As is evident from the foregoing list, many of the compounds of this invention can exist in a number of isomeric forms. It is to be understood that where isomerism is possible, all isomers, both geometric and optical, of a given compound are included within the scope of this invention.

EXAMPLE 1

8-Methoxy-5,6-dihydro-2-oxo-2H-naphtho[1,2-b]-pyran-3-carboxylic Acid Ethyl Ester ($\alpha$-pyrone)

To a mixture of sodium ethoxide prepared from 10.8 parts of sodium hydride and 31 parts of anhydrous ethanol in 300 ml. of anhydrous glyme is added dropwise 67.6 parts of ethyl ethoxymethylenecyanoacete, followed by 70.4 parts of 6-methoxy-1-tetralone dissolved in glyme. The mixture is stirred at 50° C. for 3 hours and is allowed to cool. It is slowly poured into 500 ml. of 3N. hydrochloric acid. The precipitate is collected by filtration and is suspended on 1 liter of water. The mixture is warmed on steam bath for 3 hours and allowed to cool. The solid product is collected by filtration and washed with water. It is recrystallized from ethanol-water mixture to give pure 8-methoxy-5,6-dihydro-2-oxo-2H-naphtho[1,2-b]pyran-3-carboxylic acid ethyl ester ($\alpha$-pyrone); m.p. 141°–142.5° C.

Analytical sample was prepared by recrystallizing the pyrone from dimethylformamide-water mixture; m.p. 150.5°–152° C.

Anal. Calc'd. for $C_{17}H_{16}O_5$: C: 67.99, H: 5.37
Found: C: 67.75; H: 5.48

EXAMPLE 2

The process of Example 1 is repeated but substituting an equivalent amount of 6-ethoxy-1-tetralone for 6-methoxy-1-tetralone used in Example 1 to obtain 8-ethoxy-5,6-dihydro-2-oxo-2H-naphtho[1,2-b]-pyran-3-carboxylic acid ethyl ester.

EXAMPLE 3

The process of Example 1 is repeated using 6-acetoxy-1-tetralone instead of the 6-methoxy-1-tetralone of Example 1 to produce 8-hydroxy-5,6-dihydro-2-oxo-2H-naphtho-[1,2-b]-pyran-3-carboxylic acid ethyl ester.

The above α-pyrone is dissolved in 300 ml. of acetyl chloride and is heated under reflux for 3 hours. The excess acetyl chloride is removed by evaporation under reduced pressure to give 8-acetoxy-5,6-dihydro-2-oxo-2H-naphto[1,2-b]-pyran-3-carboxylic acid ethyl ester.

EXAMPLE 4

A solution of 0.2 mole of 8-methoxy-5,6-dihydro-2-oxo-2H-naphtho[1,2-b]pyran-3-carboxylic acid ethyl ester in 200 ml. of benzene is heated at 200° C. with 3,000 atmospheres of ethylene for 20 hours in a suitable pressure vessel. The mixture is cooled. The benzene is evaporated and the solid residue is isolated. It is recrystallized from 95 percent ethanol to give pure 7-methoxy-2,3,4,4',9,10-hexahydro-2,4'-ethanophenanthrene-2-carboxylic acid ethyl ester; m.p. 92°–92.5° C.

Anal. Calcd. for $C_{20}H_{24}O_3$: C, 76.89; H, 7.74
Found: C, 77.17; H, 7.81

EXAMPLES 5 and 6

The procedure of Example 4 is repeated substituting an equivalent amount of the listed "α-Pyrone" for the 8-methoxy-5,6-dihydro-2-oxo-2H-naphtho[1,2-b]pyran-3-carboxylic acid ethyl ester of Example 4 to obtain the indicated ethanophenanthrene product.

| Ex. | α-Pyrone | Ethanophenanthrene |
|---|---|---|
| 5 | 8-ethoxy-5,6-dihydro-2-oxo-2H-naphtho[1,2-b]-pyran-3-carboxylic acid ethyl ester | 7ethoxy-2,3,4,4',9,10-hexahydro-2,4'-ethano-phenanthrene-2-carboxylic acid ethyl ester |
| 6 | 8-acetoxy-5,6-dihydro-2-oxo-2H-naphtho[1,2-b]-pyran-3-carboxylic acid ethyl ester | 7-acetoxy-2,3,4,4',9,10-hexahydro-2,4'-ethano-phenanthrene-2-carboxylic acid ethyl ester |

EXAMPLE 7

A solution of 0.2 mole of 5,6-dihydro-2-oxo-2H-naphtho[1,2-b]pyran-3-carboxylic acid ethyl ester in 200 ml. of benzene is heated at 200° C. with 1,000 atmospheres of 2-cis-butene for 18 hours in a suitable pressure vessel. The mixture is cooled. The benzene is evaporated and the solid residue is isolated. The crude 3,4-cis-dimethyl-3,4,9,10-tetrahydrophenanthrene-2-carboxylic acid ethyl ester is redissolved in 200 ml. of benzene and the resulting solution is heated at 200° C. with 3,000 atmospheres of ethylene for 20 hours in a suitable pressure vessel. The mixture is cooled. The benzene is evaporated and the crude product is chromatographed on silicic acid with chloroform as the eluent. Two main fractions are obtained and their i.r. and n.m.r. spectra show them to be exo 3,4-cis-dimethyl2,3,4,4',9,10-hexahydro-2,4'-ethanophenanthrene-2-carboxylic acid ethyl ester and endo-3,4-cis-dimethyl-2,3,4,4',9,10-hexahydro-2,4'-ethanophenanthrene-2-carboxylic acid ethyl ester.

EXAMPLES 8–11

The procedure of Example 7 is repeated substituting an equivalent amount of the indicated "α-Pyrone" for the 5,6-dihydro-2-oxo-2H-naphto[1,2-b]pyran-3-carboxylic acid ethyl ester and substituting the indicated 1,2-dialkyl "Ethylene" for 2-cis-butene of Example 7 to obtain the indicated ethanophenanthrene. The geometrical isomers are separated by means of chromatography on silicic acid, fractional crystallization, or distillation.

| Ex. | α-pyrone | Ethylene | Ethanophenanthrene |
|---|---|---|---|
| 8 | 8-methoxy-5,6-dihydro-2-oxo-2H-naphtho-[1,2-b]pyran-3-carboxylic acid ethyl ester | 2-cis-butene | 3,4-cis-dimethyl-7-methoxy-2,3,4,4',9,10-hexahydro-2,4'-ethanophenanthrene-2-carboxylic acid ethyl ester |
| 9 | 8-methoxy-5,6-dihydro-2-oxo-2H-naphtho-[1,2-b]pyran-3-carboxylic acid ethyl ester | 1-butene | 3-ethyl-7-methoxy-2,3,4,4',9,10-hexahydro-2,4'-ethanophenanthrene-2-carboxylic acid ethyl ester and 4-ethyl-7-methoxy-2,3,4,4',9,10-hexahydro-2,4'-ethanophenanthrene-2-carboxylic acid ethyl ester |
| 10 | 8methoxy-5,6-dihydro2-oxo-2H-naphtho-[1,2b]pyran-3-carboxylic acid ethyl ester | 2-cis-pentene | 3-methyl-4-cis-ethyl-7-methoxy-2,3,4,4',9,10-hexahydro-2,4'-ethanophenanthrene-2-carboxylic acid ethyl ester and 3-ethyl-4-cis-methyl-7-methoxy-2,3,4,4',9,10-hexahydro-2,4'-ethanophenanthrene-2-carboxylic acid ethyl ester |
| 11 | 5,6-dihydro-2-oxo-2H-naphtho[1,2-b]pyran-3-carboxylic acid ethyl ester | trans-3-hexene | 3,4-trans-diethyl-2,3,4,4',9,10-hexahydro-2,4'-ethanophenanthrene-2carboxylic acid ethyl ester |
| 12 | 5,6-dihydro-2-oxo-2H-naphtho[1,2-b]pyran-3-carboxylic acid ethyl ester | 2-methyl-3-cis-heptene | 3-iso-propyl-4-cis-n-propyl-2,3,4,4',9,10-hexahydro-2,4'-ethanophenanthrene-2-carboxylic acid ethyl ester and 4-iso-propyl-3-cis-n-propyl-2,3,4,4',9,10-hexahydro-2,4'-ethanophenanthrene-2-carboxylic acid ethyl ester |

EXAMPLE 13

To a solution of 15.6 parts of 7-methoxy-2,3,4,4',9,10-hexahydro-2,4'-ethanophenanthrene-2-carboxylic acid ethyl ester dissolved in 200 ml. of THF is added 55 ml. of 1 M. borane in THF under nitrogen atmosphere over a period of 15 minutes at 25°–30°. After two hours, excess borane is destroyed with 15 ml. of water. The chromic acid solution, prepared from 11 parts of sodium dichromate dihydrate and 8.25 ml. of 96 percent sulfuric acid and diluted with water to 45 ml., is added to the stirred solution over a period of 15 minutes, maintaining the temperature at 25°–30°. After stirring at 30°–35° for two hours, the mixture is poured into 500 ml. of water. The aqueous mixture is extracted with chloroform. The chloroform extract is dried over anhydrous magnesium sulfate, filtered, and concentrated. The solid residue is recrystallized from ethanol-water mixture to give pure 7-methoxy-1,2,3,4,4′9,10,10′ - octahydro - 1 - oxo - 2,4′ - ethanophenanthrene-2-carboxylic acid ethyl ester.

EXAMPLES 14–18

The procedure of Example 13 is repeated substituting an equivalent amount of the indicated "Hexahydrophenanthrene" for the 7-methoxy-2,3,4,4′,9,10-hexahydro-2,4′-ethanophenanthrene-2-carboxylic acid ethyl ester of Example 13 to obtain the indicated octahydro-1-oxo-phenanthrene product.

| Ex. | Hexahydroprophenanthrene | Octahydro-1-oxo-phenanthrene |
|---|---|---|
| 14 | 7-ethoxy-2,3,4,4′,9,10-hexahydro-2,4′-ethanophenanthrene-2-carboxylic acid ethyl ester | 7-ethoxy-1,2,3,4,4′,9,10,10′-octahydro-1-oxo-2,4′-ethanophenanthrene-2-carboxylic acid ethyl ester |
| 15 | exo-3,4-cis-dimethyl-2,3,4,4′,9,10-hexahydro-2,4′-ethano-phenanthrene-2-carboxylic acid ethyl ester | exo-3,4-cis-dimethyl-1,2,3,4,4′,9,10,10′-octahydro-1-oxo-2,4′-ethanophenanthrene-2-carboxylic acid ethyl ester |
| 16 | 4-iso-propyl-3-cis-n-propyl-7-acetoxy-2,3,4,4′,9,10-hexahydro-2,4′-ethanophenanthrene-2-carboxylic acid ethyl ester | 4-iso-propyl-3-cis-n-propyl-7-acetoxy-1,2,3,4,4′,9,10,10′-oxtahydro-1-oxo-2,4′-ethanophenanthrene-2-carboxylic acid ethyl ester |
| 17 | exo-3-ethyl-7-methoxy-2,3,4,4′,9,10-hexahydro-2,4′-ethanophenanthrene-2-carboxylic acid ethyl ester | exo-3-ethyl-7-methoxy-1,2,3,4,4′,9,10,10′-octahydro-1-oxo-2,4′-ethanophenanthrene-2-carboxylic acid ethyl ester |
| 18 | endo-4-methyl-7-methoxy-2,3,4,4′,9,10-hexahydro-2,4′-ethanophenanthrene-2-carboxylic acid ethyl ester | endo-4-methyl-7-methoxy-1,2,3,4,4′,9,10,10′-octahydro-1-oxo-2,4′-ethanophenanthrene-2-carboxylic acid ethyl ester |

EXAMPLE 19

To a solution of 16.4 parts of 7-methoxy-1,2,3,4,4′,9,10,10′-octahydro-1-oxo-2,4′-ethanophenanthrene-2-carboxylic acid ethyl ester dissolved in 100 ml. of THF is added 50 ml. of 1 M. methyl magnesium bromide in ethyl ether under nitrogen atmosphere over a period of 15 minutes, maintaining the temperature at −10°–0°. After stirring at −10°–0° for 3 hours, the mixture is poured into 300 ml. of saturated aqueous ammonium chloride solution. The upper layer is separated, and the aqueous layer extracted with ethyl ether. The combined organic extracts are dried over anhydrous magnesium sulfate, filtered, and concentrated to give 7-methoxy-1-methyl-1-hydroxy-1,2,3,4,4′,9,10,10′-octahydro-2,4′-ethanophenanthrene-2-carboxylic acid ethyl ester.

To a solution of the crude hydroxy-ester dissolved in 100 ml. of pyridine is added portionwise 9.5 parts of p-toluenesulfonyl chloride with stirring, maintaining the temperature at 25°–30°. After stirring at 25°–30° for one hour, the mixture is poured into 300 ml. of water. The aqueous mixture is extracted with chloroform several times. The combined chloroform extracts are washed with dilute hydrochloric acid, followed by water, dried over anhydrous magnesium sulfate, filtered, and concentrated. The residue is recrystallized from ethanol-water mixture to give pure 7-methoxy-1-methyl-2,3,4,4′,9,10-hexahydro-2,4′-ethanophenanthrene-2-carboxylic acid ethyl ester.

EXAMPLES 20-23

The procedure of Example 19 is repeated substituting an equivalent amount of the indicated "1-Oxophenanthrene" for the 7-methoxy-1,2,3,4,4′,9,10,10′-octahydro-1-oxo-2,4′-ethanophenanthrene-2-carboxylic acid ethyl ester, and substituting an equivalent amount of the indicated alkyl Grignard reagent for the methylmagnesium bromide of Example 19 to obtain the indicated 1-alkylethanophenanthrene.

| Ex. | 1-Oxophenanthrene | Grignard Reagent | 1-Alkyl-ethanophenanthrene |
|---|---|---|---|
| 20 | 7-acetoxy-1,2,3,4′,9,10,10′-octahydro-1-oxo-2,4′-ethanophenanthrene-2-carboxylic acid ethyl ester | n-propyl magnesium bromide | 7-acetoxy-1-n-propyl-2,3,4,4′,9,10-hexahydro-2,4′-ethanophenanthrene-2-carboxylic acid ethyl ester |
| 21 | exo-3,4-cis-dimethyl-1,2,3,4,4′,9,10,10′-octahydro-1-oxo-2,4′-ethanophenanthrene-2-carboxylic acid ethyl ester | iso-propyl magnesium bromide | exo-3,4-cis-dimethyl-1-iso-propyl-2,3,4,4′,9,10-hexahydro-2,4′-ethanophenanthrene-2-carboxylic acid ethyl ester |
| 22 | exo-3-ethyl-7-methoxy-1,2,3,4,4′,9,10,10′-octahydro-1-oxo-2,4′-ethanophenanthrene-2-carboxylic acid ethyl ester | methyl magnesium bromide | exo-3-ethyl-1-methyl-7-methoxy-2,3,4,4′,9,10-hexahydro-2,4′-ethanophenanthrene-2-carboxylic acid ethyl ester |
| 23 | endo-3-methyl-7-methoxy-1,2,3,4,4′,9,10,10′-octahydro-1-oxo-2,4′-ethanophenanthrene-2-carboxylic acid ethyl ester | methyl magnesium iodide | endo-4-methyl-1-methyl-7-methoxy-2,3,4,4′,9,10-hexahydro-2,4′-ethanophenanthrene-2-carboxylic acid ethyl ester |

EXAMPLE 24

A mixture of 0.2 mole of 7-methoxy-2,3,4,4′,9,10-hexahydro-2,4′-ethanophenanthrene-2-carboxylic acid ethyl ester, 200 ml. of ethyl acetate, and 3 parts of 10 percent palladium on charcoal is hydrogenated at an initial pressure of 50 p.s.i. in a shaker apparatus. When uptake of hydrogen is complete, the catalyst is filtered off, and the filtrate is evaporated at reduced pressure to give 7-methoxy-1,2,3,4,4′,9,10,10′-octahydro-2,4′-ethanophenanthrene-2-carboxylic acid ethyl ester; m.p. 65.5°–67.5°.

Anal. Calcd. for $C_{20}H_{26}O_3$: C, 76.40; H, 8.34
Found: C, 76.69; H, 8.40

EXAMPLES 25-31

The procedure of Example 24 is repeated substituting an equivalent amount of the indicated "Hexahydrophenanthrene" for the 7-methoxy-2,3,4,4',9,10-hexahydro-2,4'-ethanophenanthrene-2-carboxylic acid ethyl ester of Example 24 to obtain the listed octahydro derivative. When this procedure results in the formation of geometric isomers, they can be separated by means of chromatography on silicic acid or fractional crystallization.

| Ex. | Hexanophenanthrene | Octahydrophenanthrene |
|---|---|---|
| 25 | 7-ethoxy-2,3,4,4',9,10-hexahydro-2,4'-ethanophenanthrene-2-carboxylic acid ethyl ester | 7-ethoxy-1,2,3,4,4',9,10,10'-octahydro-2,4'-ethanophenanthrene-2-carboxylic acid ethyl ester; m.p. 70°–72° |
| 26 | 7-methoxy-1-methyl-2,3,4,4',9,10-hexahydro-2,4'-ethanophenanthrene-2-carboxylic acid ethyl ester | 7-methoxy-1-methyl-1,2,3,4,4',9,10,10'-octahydro-2,4'-ethanophenanthrene-2-carboxylic acid ethyl ester |
| 27 | exo-3,4-cis-diethyl-1-n-propyl-2,3,4,4',9,10-hexahydro-2,4'-ethanophenanthrene-2-carboxylic acid ethyl ester | exo-3,4-cis-diethyl-1-n-propyl-1,2,3,4,4',9,10,10'-octahydro-2,4'-ethanophenanthrene-2-carboxylic acid ethyl ester |
| 28 | 3-methyl-4-trans-ethyl-7-acetoxy-2,3,4,4',9,10-hexahydro-2,4'-ethanophenanthrene-2-carboxylic acid ethyl ester | 3-methyl-4-trans-ethyl-7-acetoxy-1,2,3,4,4',9,10,10'-octahydro-2,4'-ethanophenanthrene-2-carboxylic acid ethyl ester |
| 29 | exo-3-ethyl-1-methyl-7-methoxy-2,3,4,4',9,10-hexahydro-2,4'-ethanophenanthrene-2-carboxylic acid ethyl ester | exo-3-ethyl-1-methyl-7-methoxy-1,2,3,4,4',9,10,10'-octahydro-2,4'-ethanophenanthrene-2-carboxylic acid ethyl ester |
| 30 | endo-4-methyl-1-methyl-7-methoxy-2,3,4,4',9,10-hexahydro-2,4'-ethanophenanthrene-2-carboxylic acid ethyl ester | endo-4-methyl-1-methyl-7-methoxy-1,2,3,4,4',9,10,10'-octahydro-2,4-ethanophenanthrene-2-carboxylic acid ethyl ester |
| 31 | exo-3-methyl-7-methoxy-2,3,4,4',9,10-hexahydro-2,4'-ethanophenanthrene-2-carboxylic acid ethyl ester | exo-3-methyl-7-methoxy-1,2,3,4,4',9,10,10'-octahydro-2,4'-ethanophenanthrene-2-carboxylic acid ethyl ester |

EXAMPLE 32

Sodium hydride (0.1 mole as a 55 percent dispersion in mineral oil) is washed with several portions of n-pentane to remove the mineral oil. Dimethyl sulfoxide (50 ml.) is added, and the mixture is heated at 75°–80° for 45 minutes, or until the evolution of hydrogen ceases. The resulting solution of methylsulfinyl carbanion is cooled in an ice-water bath, and 0.1 mole of methyltriphenylphosphonium bromide in 100 ml. of warm dimethyl sulfoxide is added. The resulting dark red solution of the ylide is stirred at room temperature for 10 minutes.

To the above red solution is added a solution of 0.11 mole of 7-methoxy-1,2,3,4,4',9,10,10'-octahydro-1-oxo-2,4'-ethanophenanthrene-2-carboxylic acid ethyl ester in 50 ml. of dimethyl sulfoxide, and the reaction mixture is stirred at room temperature for 30 minutes. After cooling in an ice-bath, the mixture is filtered. The filtrate is diluted with 500 ml. of water. The aqueous mixture is extracted with ethyl ether. The ether solution is dried over anhydrous magnesium sulfate, filtered, and concentrated. The residue is crystallized from 95 percent ethanol to give 7-methoxy-1-methylene-1,2,3,4,4',9,10,10'-octahydro-2,4'-ethanophenanthrene-2-carboxylic acid ethyl ester.

A mixture of the above unsaturated ester, 100 ml. of ethyl acetate, and 1.5 parts of 10 percent palladium on charcoal is hydrogenated at an initial pressure of 50 p.s.i. in a shaker apparatus. When uptake of hydrogen is complete, the catalyst is filtered off, and the filtrate is evaporated at reduced pressure to give 7-methoxy-1-methyl-1,2,3,4,4',9,10,10'-octahydro-2,4'-ethanophenanthrene-2-carboxylic acid ethyl ester.

EXAMPLES 33–34

The procedure of Example 32 is repeated substituting an equivalent amount of the indicated "1-Oxo-phenanthrene" for the 7-methoxy-1,2,3,4,4',9,10,10'-octahydro-1-oxo-2,4'-ethanophenanthene-2-carboxylic acid ethyl ester and substituting an equivalent amount of the indicated "Wittig reagent" for the methyltriphenylphosphonium bromide of Example 32 to obtain the listed 1-alkyl-octahydro-product.

| Ex. | 1-Oxo-phenanthrene | Wittig Reagent | 1-Alkyl-Octahydrophenanthrene |
|---|---|---|---|
| 33 | 7-acetoxy-1,2,3,4,4',9,10,10'-octahydro-1-oxo-2,4'-ethanophenanthrene-2-carboxylic acid ethyl ester | ethyl-triphenyl-phosphonium bromide | 7-acetoxy-1-ethyl-1,2,3,4,4',9,10,10'-octahydro-2,4'-ethanophenanthrene-2-carboxylic acid ethyl ester |
| 34 | exo-3,4-cis-dimethyl-1,2,3,4,4',9,10,10'-octahydro-1-oxo-2,4'-ethanophenanthrene-2-carboxylic acid ethyl ester | n-butyltri-phenyl-phosphonium bromide | exo-3,4-cis-dimethyl-1-n-butyl-1,2,3,4,4',9,10,10'-octahydro-2,4'-ethanophenanthrene-2-carboxylic acid ethyl ester |

EXAMPLE 35

A mixture of 0.1 mole of 7-acetoxy-2,3,4,4',9,10-hexahydro-2,4'-ethanophenanthrene-2-carboxylic acid ethyl ester, 0.11 mole of pyrrolidine, and 300 ml. of benzene is heated under reflux for 3 hours. The mixture is cooled and washed with water, dried over anhydrous magnesium sulfate, filtered, and concentrated at reduced pressure to give 7-hydroxy-2,3,4,4',9,10-hexahydro-2,4'-ethanophenanthrene-2-carboxylic acid ethyl ester.

Repeating the procedure of Example 35 with an equivalent amount of 7-acetoxy-endo-3,4-cis-diethyl-1,2,3,4,4',9,10,10'-octahydro-2,4'-ethanophenanthrene - 2, - carboxylic acid ethyl ester yields 7-hydroxy-endo-3,4-cis-diethyl-1,2,3,4,4',-9,10,10'-octahydro-2,4'-ethanophenanthrene-2-carboxylic acid ethyl ester.

EXAMPLE 36

A mixture of 0.03 mole of 7-methoxy-1, 2, 3, 4, 4', 9, 10, 10' - octahydro - 2, 4' - ethanophenanthrene-2-carboxylic acid ethyl ester, 0.1 mole of lithium aluminum hydride, and 150 ml. of THF is refluxed under a nitrogen atmosphere for 4 hours. The mixture is cooled and water is cautiously added until the gray lithium aluminum hydride is converted to a white product. The precipitate is filtered off and is washed with THF. The filtrate is dried over anhydrous magnesium sulfate, filtered, and concentrated. The solid residue is recrystallized from methylcyclohexane to give pure 7-methoxy-1,2,3,4,4',9,10,10'-octahydro-2,4'-ethanophenanthrene-2-methanol; m.p. 113.5°–115°

Anal. Calcd. for $C_{18}H_{24}O_2$: C, 79.37; H, 8.88
Found: C, 79.52; H, 8.82

EXAMPLES 37-39

The procedure of Example 36 is repeated, substituting an equivalent amount of the indicated starting material for the 7-methoxy-1,2,3,4,4',9,10,10'-octahydro-2,4'-ethanophenanthrene-2-carboxylic acid ethyl ester of Example 36 to obtain the listed "-Methanol."

| Ex. | Starting Material | Methanol |
|---|---|---|
| 37 | 7-methoxy-2,3,4,4',9,10-hexahydro-2,4'-ethanophenanthrene-2-carboxylic acid ethyl ester | 7-methoxy-2,3,4,4',9,10-hexahydro-2,4'-ethanophenanthrene-2-methanol; m.p. 106.5°–108.5°C. |
| 38 | 7-hydroxy-1-n-propyl-2,3,4,4',9,10-hexahydro-2,4'-ethanophenanthrene-2-carboxylic acid | 7-hydroxy-1-n-propyl-2,3,4,4',9,10-hexahydro-2,4'-ethanophenanthrene-2-methanol |
| 39 | 7-ethoxy-exo-3,4-cis-diethyl-2,3,4,4',9,10-hexahydro-2,4'-ethanophenanthrene-2-carboxylic acid ethyl ester | 7-ethoxy-exo-3,4-cis-diethyl-2,3,4,4',9,10-hexahydro-2,4'-ethanophenanthrene-2-methanol |

EXAMPLE 40

To a solution of 0.01 mole of 7-methoxy-1,2,3,4,4',9,10,10' - octahydro - 2,4' - ethano - phenanthrene - 2 - methanol in 50 ml. of dry pyridine is added 5 ml. of acetic anhydride. The solution is allowed to stand for 16 hours. Then 5 ml. of water is added, and the solution is allowed to stand for 4 hours. The solution is poured into a mixture of 200 parts of ice and 200 ml. of 6N HCl. When the ice is melted, the precipitate is filtered off, is washed thoroughly with water, and is dried to give 7-methoxy-1, 2, 3, 4, 4', 9, 10, 10' - octahydro - 2, 4' - ethano - phenanthrene-2-methanol acetate ester.

EXAMPLES 41–46

The procedure of Example 40 is repeated using the indicated starting "Alcohol" and acid chloride or acid anhydride to give the indicated product.

| Ex. | Alcohol | Acid Chloride or Anhydride | Product |
|---|---|---|---|
| 41 | 7-methoxy-1-ethyl-2,3,4,4',9,10-hexahydro-2,4'-ethanophenanthrene-2-methanol | acetic anhydride | 7-methoxy-1-ethyl-2,3,4,4,',9,10-hexahydro-2,4'-ethanophenanthrene-2-methanol acetic acid ester |
| 42 | 7-methoxy-2,3,4,4',9,10-hexahydro-2,4'-ethanophenanthrene-2-methanol | propionyl chloride | 7-methoxy-2,3,4,4',9,10-hexahydro-2,4'-ethanophenanthrene-2-methanol propionic acid ester |
| 43 | exo-3,4-cis-di-n-butyl-2,3,4,4',9,10-hexahydro-2,4'-ethanophenanthrene-2-methanol | succinic anhydride | exo-3,4-cis-di-n-butyl-2,3,4,4',9,10-hexahydro-2,4'-ethanophenanthrene-2-methanol succinic acid mono-ester |
| 44 | 1-iso-propyl-1,2,3,4,4',9,10,10'-octahydro-2,4'-ethanophenanthrene-2-methanol | succinic anhydride | exo-3,4-cis-di-n-butyl-2,3,4,4',9,10-hexahydro-2,4'-ethanophenanthrene-2-methanol succinic acid mono-ester |
| 44 | 1-iso-propyl-1,2,3,4,4',9,10,10'-octahydro-2,4'-ethanophenanthrene-2-methanol | adipyl chloride | 1-iso-propyl-1,2,3,4,4',9,10,10'-octahydro-2,4', ethanophenanthrene-2-methanol adipic acid mono-ester |
| 45 | 7-hydroxy-1-ethyl-1,2,3,4,4',9,10,10'-octahydro-2,4'-ethanophenanthrene-2-methanol | iso-butyryl chloride | 7-iso-butyroxy-1-ethyl-1,2,3,4,4',9,10,10'-octahydro-2,4'-ethanophenanthrene-2-methanol iso-butyric acid ester |
| 46 | 7-hydroxy-2,3,4,4',9,10-hexahydro-2,4'-ethanophenanthrene-2-methanol | acetic anhydride | 7-acetoxy-2,3,4,4',9,10-hexahydro-2,4'-ethanophenanthrene-2-methanol acetic acid ester |

Acylation at the phenolic hydroxyl can be accomplished in the following manner:

EXAMPLE 47

A solution of 0.1 mole of 7-hydroxy-1, 2, 3, 4, 4', 9, 10, 10' - octahydro - 2, 4' - ethano - phenanthrene-2-methanol in 50 ml. of pyridine is treated with 0.1 mole of acetic anhydride according to the procedure of Example 57, to give 7-acetoxy-1, 2, 3, 4, 4', 9, 10, 10' - octahydro - 2, 4' - ethano - phenanthrene-2-methanol.

EXAMPLE 48

A solution of 0.1 mole of 7-acetoxy-1, 2, 3, 4, 4', 9, 10, 10' - octahydro - 2, 4' - ethano - phenanthrene-2-methanol acetic acid ester and 0.1 mole of potassium carbonate in 100 ml. of 90 percent ethanol is refluxed for 16 hours. The resulting solution is cooled, poured into ice-water, and acidified with hydrochloric acid. The precipitate is filtered off, is washed with water, and is dried to give 7-hydroxy-1, 2, 3, 4, 4', 9, 10, 10' - octahydro - 2, 4' - ethano - phenanthrene-2-methanol acetic acid ester.

The compounds of Formula (2) can be administered to prevent pregnancy in warm-blooded animals according to the method of this invention by any suitable means. For example, administration can be parenterally, that is subcutaneously or intramuscularly. Alternatively administration can be by the oral or rectal route. These compounds can be administered in single or divided doses for from 0 to 15 days after coitus.

In general, the dosage for administering the compounds of this invention to warm-blooded animals is in the range of approximately 0.001–50 mg/kg-day. It is preferred that the compounds of this invention be administered at a dosage of from 0.005–10 mg/kg-day with a dosage of from 0.01–5 mg/kg-day being most preferred.

It is also preferred that these compounds be administered in a single oral dose after coitus, but before estimated time of implantation of the fertilized egg in the uterus.

The compounds of this invention are orally effective when administered to warm-blooded animals as is demonstrated by the following test. This test particularly demonstrates that the compounds of this invention demonstrate outstanding inhibition of pregnancy in rats.

EXAMPLE 48

Immature female rats (28 days old) are induced into precocious puberty with a single dose of pregnant mare's serum gonadotrophin and then are mated with normal males. 7-Methoxy-1,2,3,4,4',9,10,10'-octahydro-2,4'-ethanophenanthrene-2-methanol suspended in sesame oil is orally administered in graded doses to numerically equal groups of these female rats for six days starting on the day of finding sperm or a vaginal plug. One week after mating, the animals are killed and their uteri are examined for implantation sites. If any are found, the animal is considered pregnant. Control animals have a mean of eight implantation sites. The dose level at which 50 percent of the animals show no evidence of pregnancy, the $ED_{50}$, is between 0.31 and 1.25 mg./kg.-day.

Similar results are obtained when 7-methoxy-2,3,4,4'-9,10-hexahydro-2,4'-ethanophenanthrene-2-methanol is substituted in the test of Example 47 for 7-methoxy-1,2,3,4,4'-9,10,10'-octahydro-2,4'-ethanophenanthrene-2-methanol.

The compounds for the method of this invention can also be employed with equally satisfactory results to prevent pregnancy in other laboratory animals such as mice, guinea pigs, rabbits, monkeys and chimpanzees and are also effective in preventing pregnancy in domestic animals such as swine, cows, sheep and horses. In small animals it is usually convenient to administer the compounds of this invention in the form of a capsule, or incorporated in the feed of the animal. However, when these compounds are administered to large animals, it is often more convenient to administer them parenterally.

The compounds of Formula (2) can be employed in useful compositions according to the present invention in such dosage forms as tablets, capsules, powder packets, or liquid solutions, suspensions, or elixirs, for oral administration or liquid solutions for parenteral use, and in certain cases, suspensions for parenteral use. In such compositions, the active ingredient will ordinarily always be present in an amount of at least 0.01 percent by weight based on the total weight of the composition and not more than 90 percent by weight.

Besides the active ingredient of this invention, the composition will contain a solid or liquid non-toxic pharmaceutical carrier for the active ingredient.

In one embodiment of a pharmaceutical composition of this invention, the solid carrier is a capsule which can be of the ordinary gelatin type. The capsule will contain from about 0.1–75 percent by weight of a compound of formula (2) and 99.9–25 percent of a carrier.

In another embodiment, the active ingredient is tableted with or without adjuvants. In yet another embodiment, the active ingredient is put into powder packets. These capsules, tablets, and powders will generally constitute from about 0.5 to about 95 percent and preferably from 1 to 50 percent by weight of active ingredient. These dosage forms preferably contain from about 0.5 to about 250 milligrams of active ingredient, with from about 1 milligram to about 50 milligrams most preferred.

The pharmaceutical carrier can, as previously indicated, be a sterile liquid such as water and oils, including those of petroleum, animal, vegetable or synthetic origin, for example peanut oil, soybean oil, mineral oil, sesame oil, and the like. In general water, saline, aqueous dextrose (glucose) and related sugar solutions and glycols such as propylene glycol or polyethylene glycols are preferred liquid carriers, particularly for injectable solutions. Sterile injectable solutions such as saline will ordinarily contain from about 0.05 to 25 percent, and preferably about 0.1 to 5 percent by weight of the active ingredient.

As mentioned above, oral administration can be in a suitable suspension, syrup or elixir in which the active ingredient ordinarily will constitute from about 0.01 to 5 percent and preferably about 0.05 to 1 percent by weight. The pharmaceutical carrier in such composition can be an aqueous vehicle such as an aromatic water, syrup or a pharmaceutical mucilage.

Suitable pharmaceutical carriers are described in "Remington's Pharmaceutical Sciences" by E. W. Martin, a well-known reference text in this field.

We claim:
1. A compound of the formula

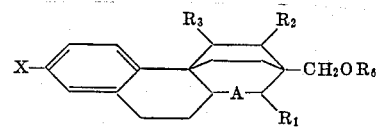

where
A is selected from the group consisting of a single bond and a double bond;
X is selected from the group consisting of hydrogen, hydroxyl, the —OR group, and the

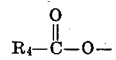

group, wherein R is a $C_1$—$C_4$ alkyl and $R_4$ is hydrogen or a $C_1$-$C_{12}$ alkyl;
each of $R_1$, $R_2$, and $R_3$ independently is selected from the group consisting of hydrogen and a $C_1$—$C_6$ alkyl; with the proviso that when X is hydrogen, at least one of $R_1$, $R_2$, and $R_3$ is a $C_1$—$C_6$ alkyl; and
$R_6$ is selected from the group consisting of hydrogen, a $C_1$—$C_4$ ester-forming aliphatic monocarboxylic acid radical, and a $C_2$—$C_6$ hemiester-forming aliphatic dicarboxylic acid radical.

2. A compound of claim 1 wherein each of $R_1$, $R_2$, and $R_3$ is hydrogen; X is selected from the group consisting of HO—, $CH_3O$—, $C_2H_5O$—, and $CH_3COO$—; and $R_6$ is hydrogen.

3. A compound of claim 1 wherein at least one of $R_1$, $R_2$, and $R_3$ is methyl or ethyl; and X is selected from the group consisting of HO—, $CH_3O$—, and $CH_3COO$—.

4. A compound of claim 3 which is 7-methoxy-1,2,3,4,4',9,10,10'-octahydro-2,4'-ethanophenanthrene-2-methanol.

5. A compound of claim 3 which is 7-methoxy-2,3,4,4',9,10-hexahydro-2,4'-ethanophenanthrene-2-methanol.

* * * * *